United States Patent
Prociw et al.

(10) Patent No.: US 11,274,601 B2
(45) Date of Patent: Mar. 15, 2022

(54) INTERNAL FUEL/AIR HEAT EXCHANGERS

(71) Applicant: Delavan Inc., West Des Moines, IA (US)

(72) Inventors: Lev A. Prociw, Johnston, IA (US); Jason Ryon, Carlisle, IA (US)

(73) Assignee: Delavan Inc., West Des Moines, IA (US)

( * ) Notice: Subject to any disclaimer, the term of this patent is extended or adjusted under 35 U.S.C. 154(b) by 136 days.

(21) Appl. No.: 16/696,624

(22) Filed: Nov. 26, 2019

(65) Prior Publication Data

US 2021/0156310 A1    May 27, 2021

(51) Int. Cl.
| | |
|---|---|
| *F02C 7/141* | (2006.01) |
| *F01D 25/12* | (2006.01) |
| *F01D 25/14* | (2006.01) |
| *F28D 1/02* | (2006.01) |

(52) U.S. Cl.
CPC .............. *F02C 7/141* (2013.01); *F01D 25/12* (2013.01); *F01D 25/14* (2013.01); *F28D 1/0233* (2013.01)

(58) Field of Classification Search
CPC ...... F02C 7/14; F02C 7/16; F02C 7/18; F02C 7/185; F02C 7/141; F28D 1/0233
See application file for complete search history.

(56) References Cited

U.S. PATENT DOCUMENTS

| | | | |
|---|---|---|---|
| 2013/0152599 A1* | 6/2013 | Minnear | C04B 41/009 60/779 |
| 2013/0219915 A1 | 8/2013 | Prociw et al. | |
| 2015/0361897 A1* | 12/2015 | Steele | F23R 3/283 60/739 |
| 2017/0051834 A1* | 2/2017 | Webster | F16J 15/447 |
| 2017/0167385 A1 | 6/2017 | Hill et al. | |
| 2017/0254269 A1* | 9/2017 | Snyder | F01D 17/02 |
| 2019/0063322 A1* | 2/2019 | Cheung | F23R 3/005 |

FOREIGN PATENT DOCUMENTS

EP    3401603 A1    11/2018

OTHER PUBLICATIONS

Extended European Search Report dated Apr. 16, 2021, issued during the prosecution of European Patent Application No. EP 20208050.3.

* cited by examiner

*Primary Examiner* — Craig Kim
(74) *Attorney, Agent, or Firm* — Locke Lord LLP; Joshua L. Jones; Scott D. Wofsy

(57) ABSTRACT

A system includes an engine case. A heat exchanger is included inside the engine case. The heat exchanger includes an air passage and a fuel passage. The air passage and fuel passage are in fluid isolation from one another, but are in thermal communication with one another for exchange of heat.

18 Claims, 4 Drawing Sheets

INTERNAL FUEL/AIR HEAT EXCHANGERS

BACKGROUND

1. Field

The present disclosure relates to heat exchangers and fuel manifolds, and more particularly to heat exchangers and fuel manifolds for gas turbine engines.

2. Description of Related Art

There has been an ongoing trend for gas turbine engine compressors to have higher and higher compression ratios. This means higher and higher compressor discharge air temperatures. Components exposed to compressor discharge air, and even the last few stages of the compressor, may require cooling where in earlier engines with lower compression ratios no cooling was required.

Cooling high pressure air with fuel to produce cooling air and recovering the heat to the fuel for combustion would be advantageous for more advanced engines. One challenge in achieving this is the low temperature capability of O-ring and other seal materials typically used in sealing conventional fuel system conduits.

The conventional techniques have been considered satisfactory for their intended purpose. However, there is an ever present need for improved systems and methods for heat exchange in gas turbine engines. This disclosure provides a solution for this need.

SUMMARY

A system includes an engine case. A heat exchanger is included inside the engine case. The heat exchanger includes an air passage and a fuel passage. The air passage and fuel passage are in fluid isolation from one another, but are in thermal communication with one another for exchange of heat.

There can be a single port through the engine case for supplying cooling air outside the engine case from the heat exchanger. The heat exchanger can be devoid of polymeric O-rings inside the engine case. A polymeric O-ring can seal between the heat exchanger and the engine case at the single port.

A fuel manifold can be included inside the engine case in fluid communication with the fuel passage of the heat exchanger for supplying fuel from the heat exchanger to the fuel manifold. A hard connection can connect the heat exchanger to the fuel manifold. A plurality of fuel injectors can be in fluid communication with the fuel manifold. A combustor can be included within the engine case. The combustor can include a combustor dome operatively connected with the fuel injectors for issuing an atomized mix of compressor discharge air and fuel into the combustor for combustion.

The heat exchanger can include a toroidal double walled tube. The fuel passage can be defined between inner and outer walls of the double walled tube. The heat exchanger can include an outer tube outside of the double walled tube. The air passage can include a space between the outer tube and the outer wall of the double walled tube and a space inward of the inner wall of the double walled tube. A fuel inlet fitting can be included at a first circumferential end of the double walled tube. A fuel outlet fitting can be included at a second end of the double walled tube, wherein the fuel inlet fitting and the fuel outlet fitting provide fluid communication for the fuel passage through the double walled tube. An air outlet fitting can be connected to a first circumferential end of the outer tube for fluid communication of air from the air passage out of the outer tube. The double wall tube and outer tube can be a first heat exchanger ring, and at least one additional heat exchanger ring can be included. The heat exchanger rings can be connected to an air outlet manifold with a single air outlet fitting for outletting air from the heat exchanger rings. The heat exchanger rings can be axially arranged in order of largest torus diameter to smallest in a direction from upstream to downstream relative to the engine case.

A method includes feeding compressor discharge air into a heat exchanger located inside an engine case and feeding fuel into the heat exchanger. The method includes transferring heat from the compressor discharge air to the fuel in the heat exchanger.

The method can include outletting the compressor discharge air from the heat exchanger through a wall of the engine case to an exterior of the engine case. The method can include outletting the fuel from the heat exchanger to a fuel manifold, distributing the fuel from the manifold to a plurality of fuel injectors, and combusting the fuel in a combustor connected to the fuel injectors.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
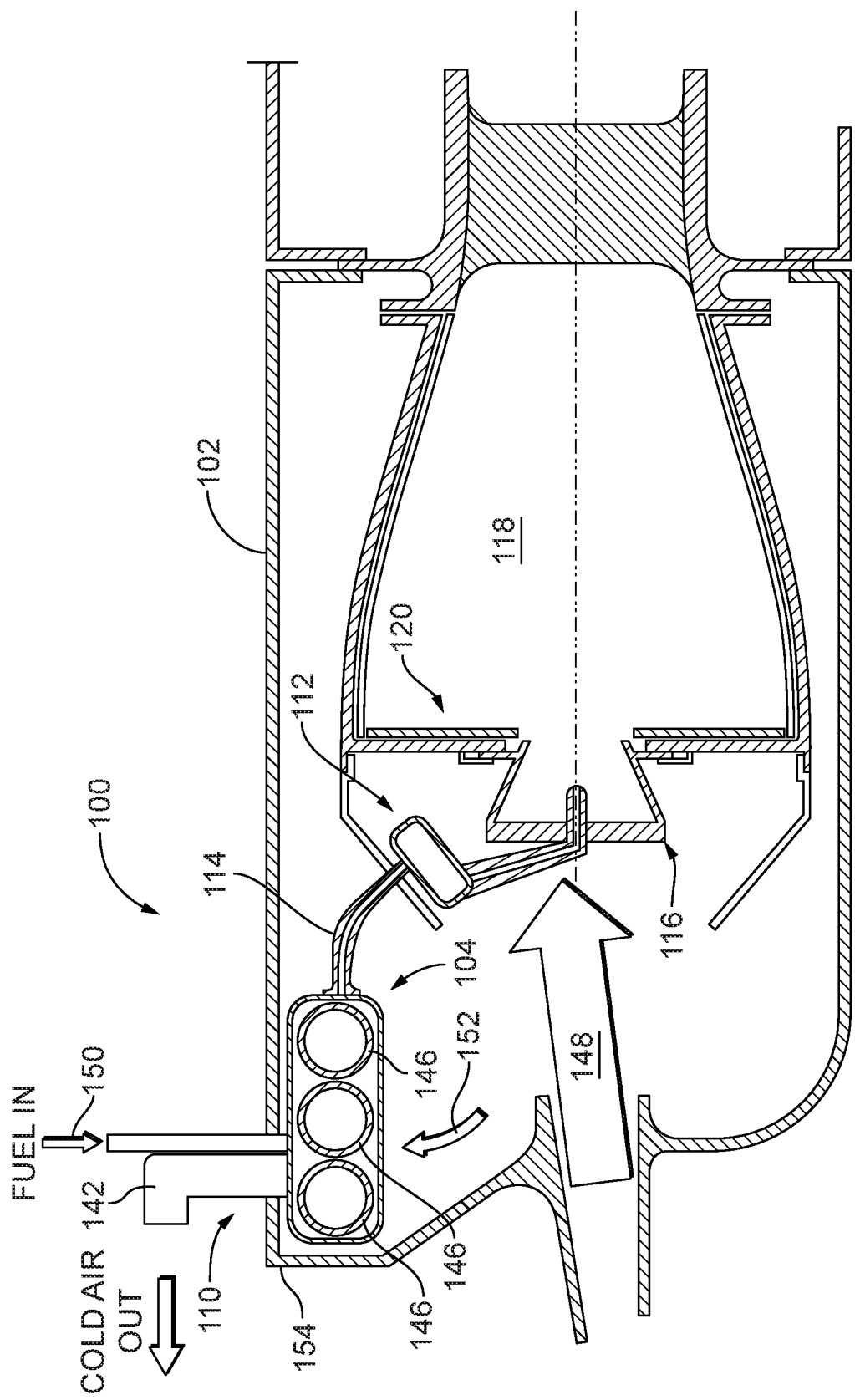
FIG. 1 is a schematic cross-sectional side elevation view of an embodiment of a system constructed in accordance with the present disclosure, showing the heat exchanger and fuel manifold.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used for fuel/air heat exchange inside engine cases in gas turbine engines.

The system 100 includes an engine case 102. A heat exchanger 104 is included inside the engine case 102. The heat exchanger 104 includes an air passage 106 and a fuel passage 108, which are labeled in FIG. 3. The air passage 106 and fuel passage 108 are in fluid isolation from one another, but are in thermal communication with one another for exchange of heat.

With configured reference to FIG. 1, there is a single port 110 through the engine case 102 for supplying cooling air outside the engine case 102 from the heat exchanger 104, as indicated by the large arrow from the port 110 in FIG. 1. The heat exchanger 104 is devoid of polymeric O-rings and seals inside the engine case 102, although it is possible to use a polymeric O-ring to seal between the heat exchanger 104 and the engine case 102 at the single port 110, where temperatures can be low enough to permit. Typical O-rings and polymeric seals do not permit temperatures in excess of about 500° F. (260° C.). Modern fuel temperatures can be roughly 900° F. (482° C.), and modern compressor discharge air temperatures can be in excess of 1000° F. (540° C.)

Referring still to FIG. 1, a fuel manifold 112 is included inside the engine case 102 in fluid communication with the fuel passage 108 (labeled in FIG. 3) of the heat exchanger 104 for supplying fuel, e.g. preheated fuel, from the heat exchanger 104 to the fuel manifold 112. A hard connection 114 connects the fuel passage 108 of the heat exchanger 104 to the fuel manifold 112, i.e. wherein there are no polymeric O-rings or seals along the pathway between the heat exchanger 104 and the fuel manifold 112. A plurality of fuel injectors 116 are in fluid communication with the fuel manifold 112 for issuing atomized air and fuel into the combustor 118 that is included within the engine case 102. FIG. 1 is a cross-section that only shows one fuel injector 116, however those skilled in the art will readily appreciate that a plurality of conventional or multipoint injectors 116 are circumferentially distributed around the annular geometry of the system 100. The combustor 118 includes a combustor dome 120 operatively connected with the fuel injectors 116 for issuing an atomized mix of compressor discharge air and fuel into the combustor 118 for combustion.

Figure 2:
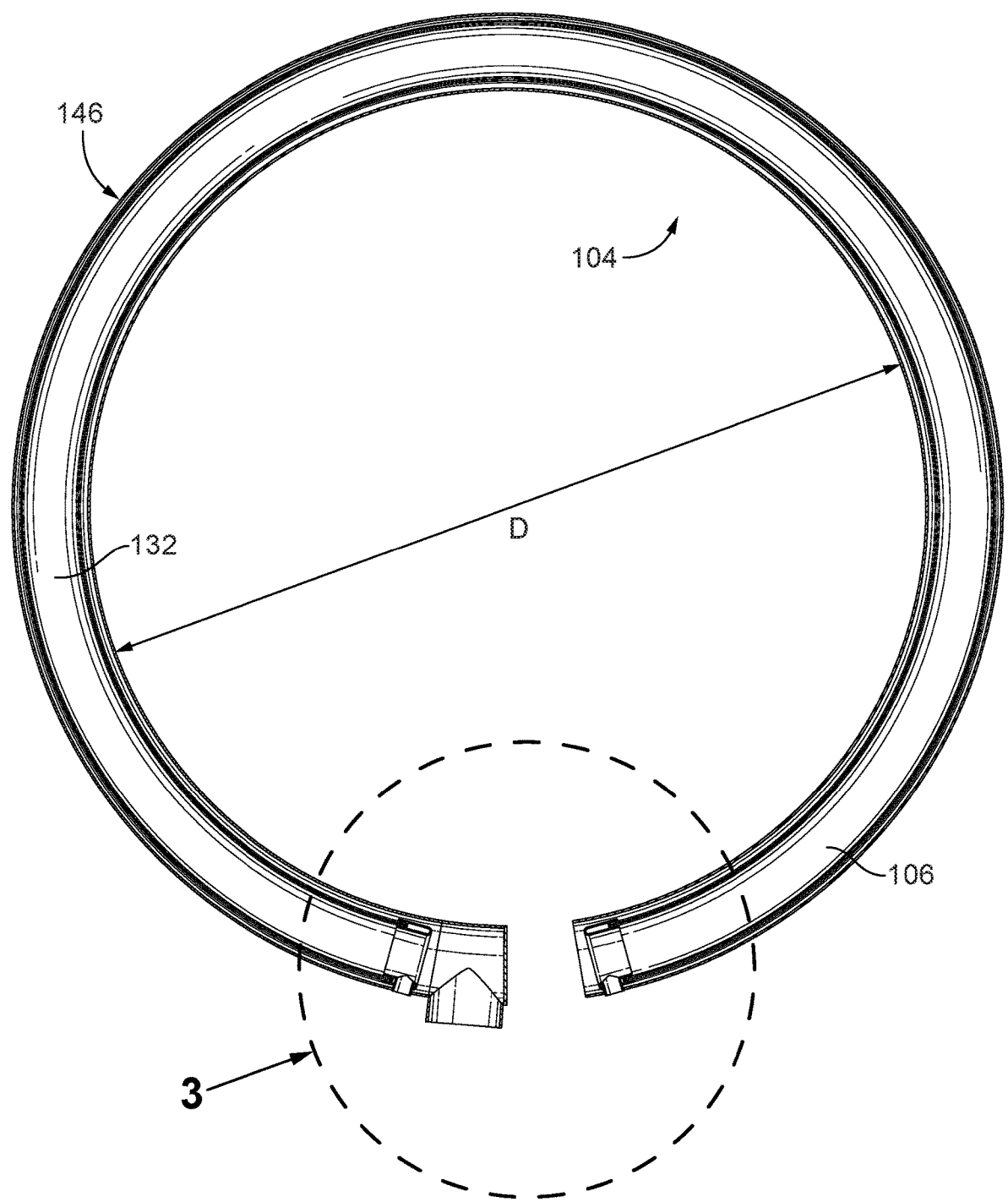
FIG. 2 is a cross-sectional axial elevation view of a portion of the heat exchanger of FIG. 1, showing a single heat exchanger ring.
Figure 3:
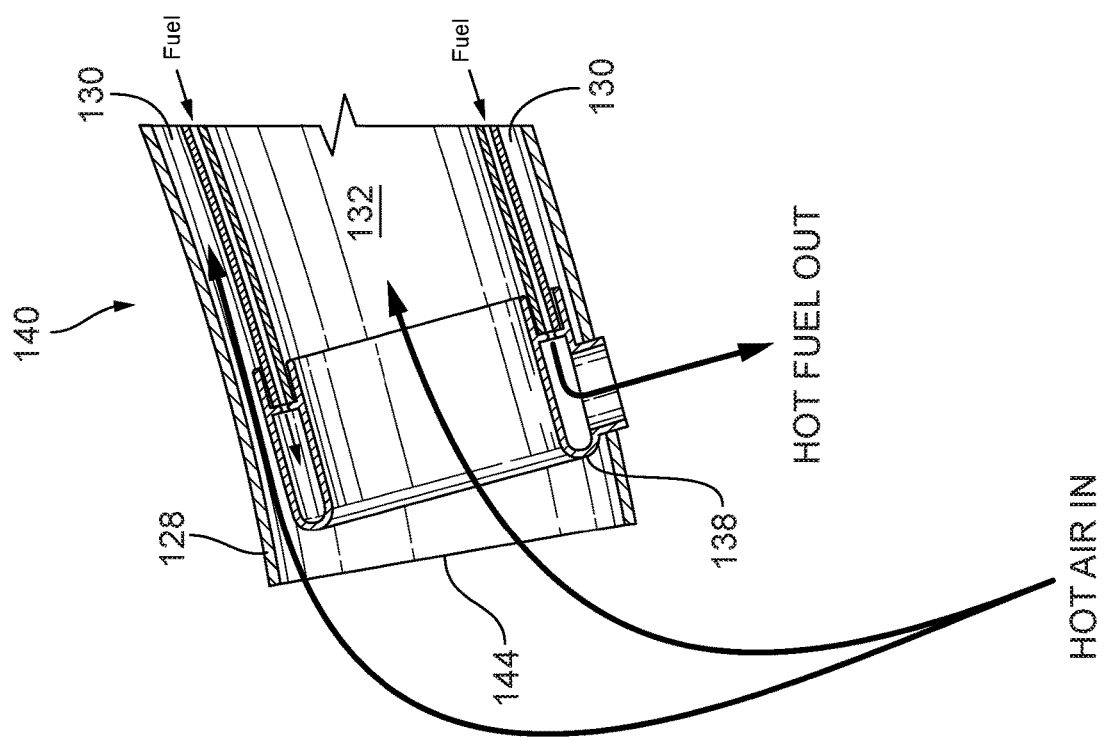
FIG. 3 is a cross-sectional axial elevation view of a portion of the heat exchanger ring of FIG. 2, showing the inlets and outlets.
Figure 3:
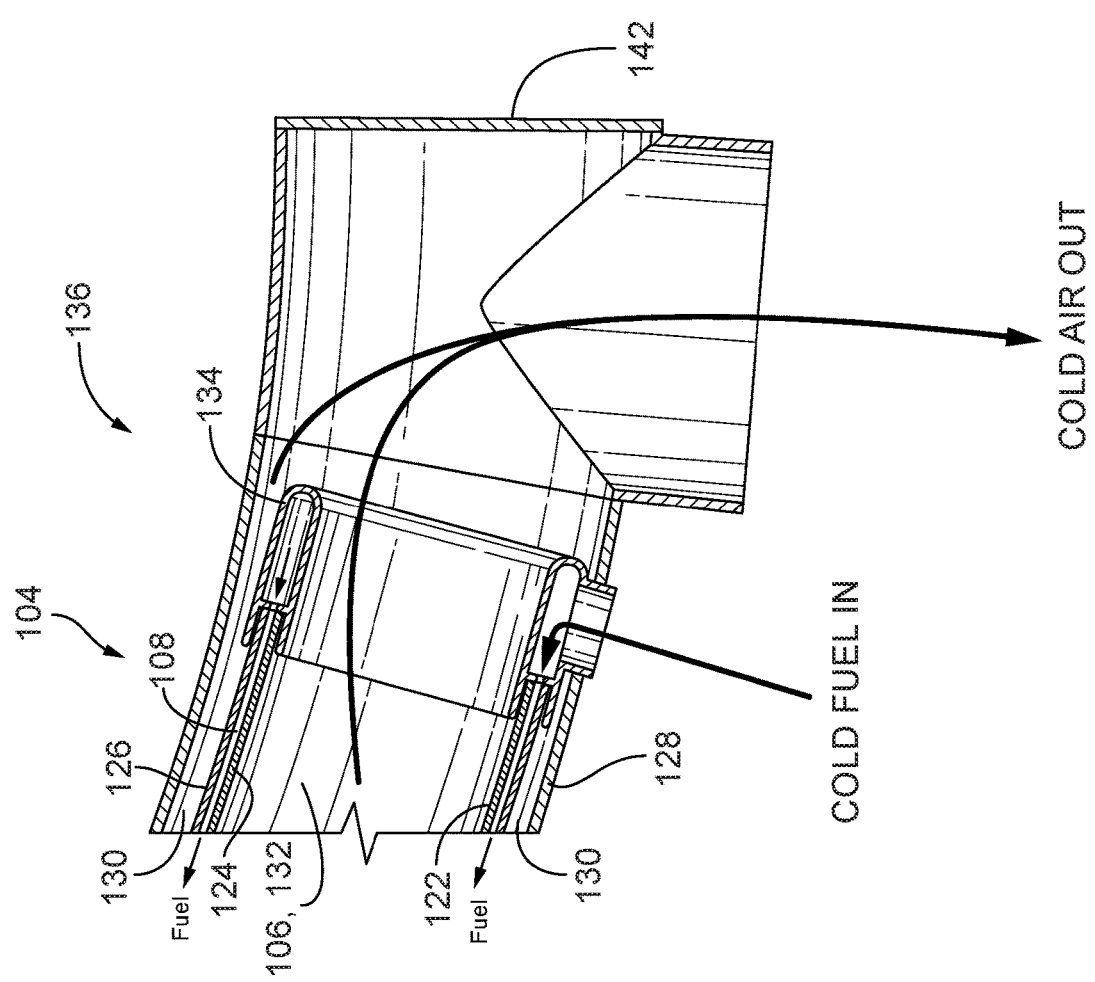

With reference now to FIGS. 2-3, the heat exchanger 104 includes a toroidal, double walled tube 122. The fuel passage 108 is defined between inner wall 124 and the outer walls 126 of the double walled tube 122. The heat exchanger 104 includes an outer tube 128 outside of the double walled tube 122. The air passage 106 includes first, a space 130 between the outer tube 128 and the outer wall 126 of the double walled tube 122 and second, a space 132 inward of the inner wall 124 of the double walled tube 122. The air passage 106 therefore exchanges heat on both the inside and outside of the double walled tube 122. A fuel inlet fitting 134 is included at a first circumferential end 136 of the double walled tube 122. A fuel outlet fitting 138 is included at the second end 140 of the double walled tube 122. The fuel inlet fitting 134 and the fuel outlet fitting 138 provide fluid communication for the fuel passage 108 through the outer tube. An air outlet fitting 142 is connected to a first circumferential end 136 of the outer tube 128 for fluid communication of air from the air passage 106 out of the outer tube 128. The opposite end 144 of the outer tube 128 can simply be open to receive compressor discharge air, as indicated by the forked arrow in FIG. 3.

Figure 4:
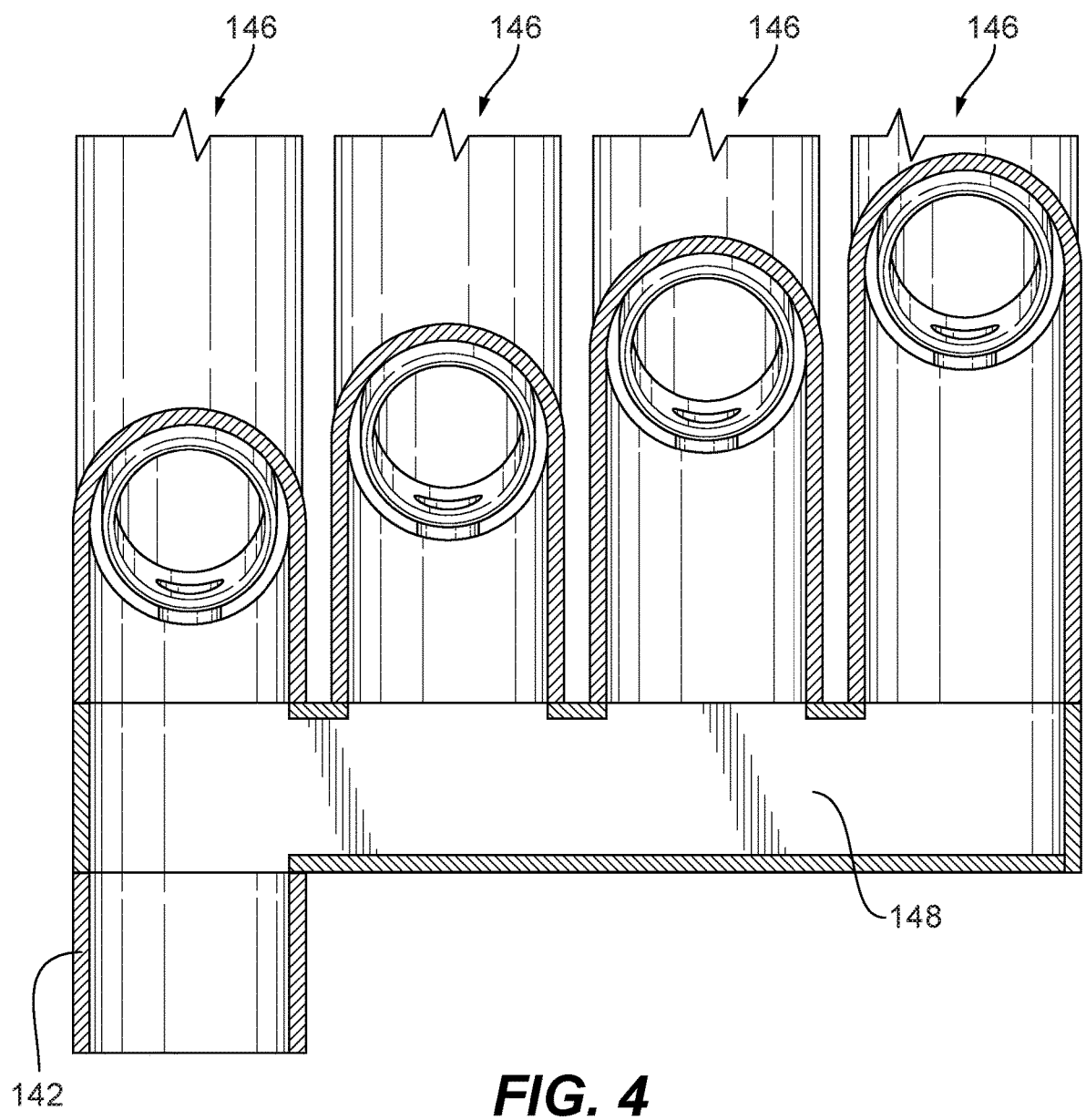
FIG. 4 is a cross-sectional side elevation view of an arrangement of heat exchanger tubes of FIG. 2, showing a single outlet manifold connecting all of the heat exchanger rings.

Referring now to FIGS. 2 and 4, the double wall tube 122 and outer tube 128 can be one in a plurality of similar heat exchanger ring 146. The heat exchanger rings 146 can be connected to an air outlet manifold 148 with a single air outlet fitting 142 for outletting air from all of the heat exchanger rings 146, e.g. the air outlet manifold 148 collects the outlet air from all of the heat exchanger rings 146 and routes it all out the outlet fitting 142, which can issue the cooled air through the port 110 in FIG. 1. This inlet/outlet arrangement for the fuel and air makes the heat exchanger 104 a counter-flow heat exchanger, which can minimize thermal stress.

The heat exchanger rings 146 can be axially arranged, from left to right as oriented in FIG. 4, in order of largest torus diameter D to smallest, which corresponds to a direction from upstream to downstream relative to the engine case 102 of FIG. 1. It is also contemplated that the heat exchanger rings 146 can all have the same torus diameter, as shown in FIG. 1. The torus diameter D is labeled in FIG. 2.

Referring again to FIG. 1, a method includes feeding compressor discharge air (indicated by arrow 148) into a heat exchanger 104 located inside an engine case 102 and feeding fuel into the heat exchanger, as indicated by arrow 150. The method includes transferring heat from the compressor discharge air to the fuel in the heat exchanger 104. This cools the portion of the compressor discharge air in the heat exchanger 104 (this portion is indicated by arrow 152), and preheats the fuel in the heat exchanger 104. The method can include outletting the compressor discharge air from the heat exchanger 104 through a wall 154 of the engine case 102 to an exterior of the engine case 102. The method can include outletting the fuel from the heat exchanger 104 to a fuel manifold 112, distributing the fuel from the manifold 112 to a plurality of fuel injectors 116, and combusting the fuel in a combustor 118 connected to the fuel injectors 116.

The use of tubular geometry for the heat exchanger rings 146 allows placement of the heat exchanger 104 inside a high pressure engine case 102. Using tubing also reduces the number of sealed connections and allows for ease of inspection. Systems and methods as disclosed herein can reduce or eliminate risk of hot fuel leakage anywhere external to an engine. There is also a reduced or eliminated risk of damage to the hot fuel system such as from ballistic objects like FOD (foreign object debris) striking the hot fuel components. Locating heat exchangers within engine cases, close to fuel manifolds, can reduce weight, cost, and risk.

The methods and systems of the present disclosure, as described above and shown in the drawings, provide for fuel/air heat exchange inside engine cases in gas turbine engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
an engine case; and
a heat exchanger inside the engine case, wherein the heat exchanger includes an air passage and a fuel passage, wherein the air passage and fuel passage are in fluid isolation from one another, but are in thermal communication with one another for exchange of heat, wherein the heat exchanger includes a toroidal double walled tube, wherein the fuel passage is defined between inner and outer walls of the double walled tube, wherein the heat exchanger includes an outer tube outside of the double walled tube, wherein the air passage includes:
a first space wherein the first space is between the outer tube and the outer wall of the double walled tube; and a second space wherein the second space is inward of the inner wall of the double walled tube, wherein an open circumferentially facing end of the outer tube is an inlet from inside the engine case into the first space between the outer tube and the outer wall of the double wall tube and to the second space inward of the inner wall of the double walled tube, and wherein an outlet fitting has a single outlet for both the first space between the outer tube and the outer wall of the double wall tube and for the second space inward of the inner wall of the double walled tube.

2. The system as recited in claim 1, wherein there is a single port through the engine case for supplying cooling air outside the engine case from the heat exchanger.

3. The system as recited in claim 2, wherein heat exchanger is devoid of polymeric O-rings inside the engine case.

4. The system as recited in claim 3, further comprising a polymeric O-ring sealing between the heat exchanger and the engine case at the single port.

5. The system as recited in claim 1, further comprising a fuel manifold inside the engine case in fluid communication with the fuel passage of the heat exchanger for supplying fuel from the heat exchanger to the fuel manifold.

6. The system as recited in claim 5, wherein a hard connection connects the heat exchanger to the fuel manifold.

7. The system as recited in claim 5, further comprising a plurality of fuel injectors in fluid communication with the fuel manifold.

8. The system as recited in claim 7, further comprising a combustor within the engine case, wherein the combustor includes a combustor dome operatively connected with the fuel injectors for issuing an atomized mix of compressor discharge air and fuel into the combustor for combustion.

9. The system as recited in claim 1, further comprising a fuel inlet fitting at a first circumferential end of the double walled tube, and a fuel outlet fitting at a second end of the double walled tube, wherein the fuel inlet fitting and the fuel outlet fitting provide fluid communication for the fuel passage through the double walled tube.

10. The system as recited in claim 1, further comprising an air outlet fitting connected to a first circumferential end of the outer tube for fluid communication of air from the air passage out of the outer tube.

11. The system as recited in claim 10, wherein the double wall tube and outer tube are a first heat exchanger ring, and further comprising at least one additional heat exchanger ring.

12. The system as recited in claim 11, wherein the first heat exchanger ring and the at least one additional heat exchanger ring are connected to an air outlet manifold with a single air outlet fitting for outletting air from the first heat exchanger ring and the at least one additional heat exchanger ring.

13. A system comprising:
an engine case; and
a heat exchanger inside the engine case, wherein the heat exchanger includes an air passage and a fuel passage, wherein the air passage and fuel passage are in fluid isolation from one another, but are in thermal communication with one another for exchange of heat, wherein the heat exchanger includes a toroidal double walled tube, wherein the fuel passage is defined between inner and outer walls of the double walled tube, wherein the heat exchanger includes an outer tube outside of the double walled tube, wherein the air passage includes:
a first space wherein the first space is between the outer tube and the outer wall of the double walled tube;
a second space wherein the second space is inward of the inner wall of the double walled tube; and
an air outlet fitting connected to a first circumferential end of the outer tube for fluid communication of air from the air passage out of the outer tube, wherein the double wall tube and outer tube are a first heat exchanger ring, and further comprising at least one additional heat exchanger ring, wherein the first heat exchanger ring and the at least one additional heat exchanger ring are axially arranged in order of largest torus diameter to smallest in a direction from upstream to downstream relative to the engine case.

14. A method comprising:
feeding compressor discharge air into a heat exchanger located inside an engine case;
feeding fuel into the heat exchanger; and
transferring heat from the compressor discharge air to the fuel in the heat exchanger, wherein the heat exchanger includes a toroidal double walled tube, wherein a fuel passage is defined between inner and outer walls of the double walled tube, wherein feeding fuel into the heat exchanger includes feeding fuel through the fuel passage, wherein the heat exchanger includes an outer tube outside of the double walled tube, wherein an air passage includes:
a first space wherein the first space is between the outer tube and the outer wall of the double walled tube; and
a second space wherein the second space is inward of the inner wall of the double walled tube, wherein feeding compressor discharge air into the heat exchanger includes feeding compressor discharge air into the air passage.

15. The method as recited in claim 14, further comprising outletting the compressor discharge air from the heat exchanger through a wall of the engine case to an exterior of the engine case.

16. The method as recited in claim 14, further comprising outletting the fuel from the heat exchanger to a fuel manifold.

17. The method as recited in claim 16, further comprising distributing the fuel from the manifold to a plurality of fuel injectors.

18. The method as recited in claim 17, further comprising combusting the fuel in a combustor connected to the fuel injectors.

* * * * *